United States Patent [19]

Turner

[11] Patent Number: 5,402,415
[45] Date of Patent: Mar. 28, 1995

[54] MULTICAST VIRTUAL CIRCUIT SWITCH USING CELL RECYCLING

[75] Inventor: Jonathan S. Turner, St. Louis, Mo.

[73] Assignee: Washington University, St. Louis, Mo.

[21] Appl. No.: 52,575

[22] Filed: Apr. 22, 1993

[51] Int. Cl.$^6$ .................................. H04L 12/56
[52] U.S. Cl. ........................... 370/60; 370/94.2
[58] Field of Search ............ 370/60, 60.1, 85.6, 370/94.1, 94.2

[56] References Cited

U.S. PATENT DOCUMENTS 4,542,497 9/1985 Huang et al. ..................... 370/60
4,813,038 3/1989 Lee ................................ 370/94.1
5,127,000 6/1992 Henrion ........................... 370/60
5,237,571 8/1993 Cotton et al. ..................... 370/60
5,305,311 4/1994 Lyles ............................... 370/60

Primary Examiner—Benedict V. Safourek
Attorney, Agent, or Firm—Rogers, Howell & Haferkamp

[57] ABSTRACT

Multicasting is implemented in a virtual circuit switch for an ATM network by recycling data cells through the switch fabric a multiple number of times with a copy-by-two network creating an additional data cell upon each recycle to thereby satisfy the number of connection addresses in the multicast connection. Resequencing of the data cells may be implemented at the exit to the switch fabric as well as upon each recycle of data cells through the switch fabric.

25 Claims, 7 Drawing Sheets

MULTICAST VIRTUAL CIRCUIT SWITCH USING CELL RECYCLING

GOVERNMENT RIGHTS

This invention was made with government support under grant number NCR 8914396 awarded by the National Science Foundation. The government has certain rights in the invention.

BACKGROUND AND SUMMARY OF THE INVENTION

Figure 1:
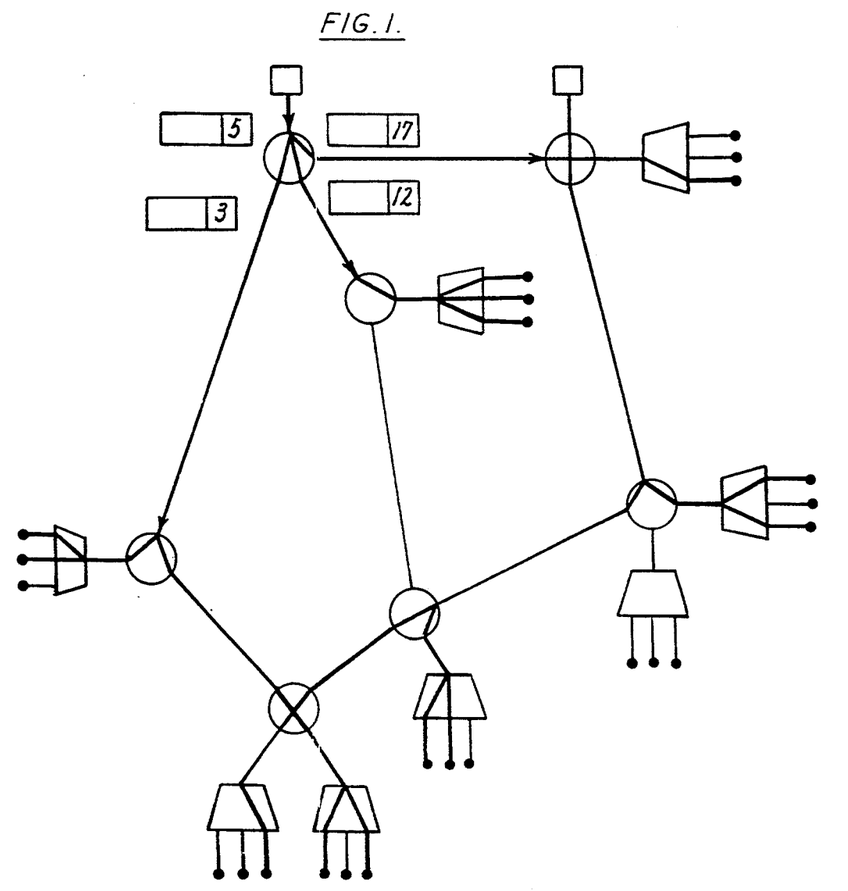
FIG. 1 is a schematic diagram of an ATM network illustrating multicast virtual circuit switching.

Multicast virtual circuit networks of the prior art support communication paths from a sender to an arbitrary number of receivers, as illustrated in FIG. 1. As shown, multicast virtual circuits induce a tree in a network connecting a sender to one or more receivers. Switching systems participating in the virtual circuit replicate received cells using virtual circuit identifiers in the cell headers to access control information stored in the switching system's internal control tables, then use this information to identify the outputs the cells are to be sent to and relabel the copies before forwarding them on to other switching systems.

Figure 2:
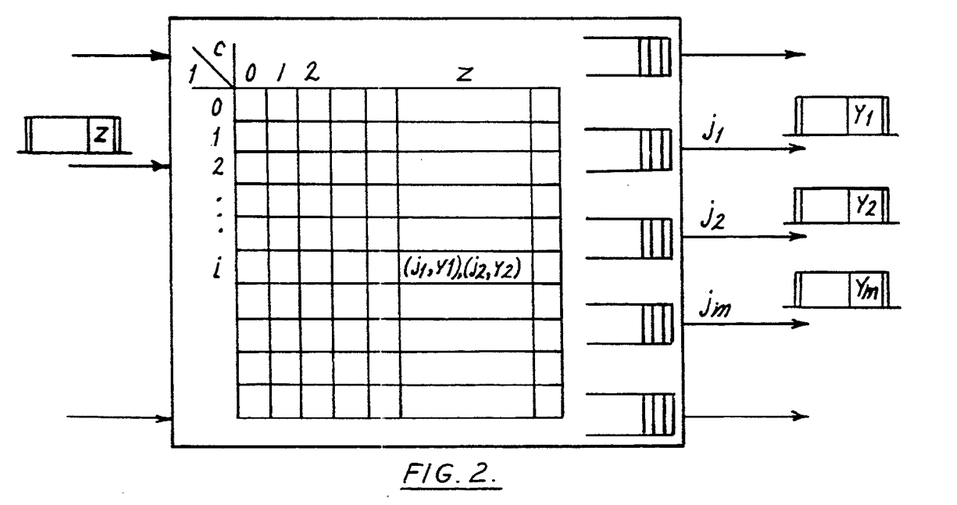
FIG. 2 illustrates the function of a multicast ATM switch.

FIG. 2 illustrates in more detail the function of a multicast virtual circuit switch. The switch includes control information, shown here as a table, which for each incoming virtual circuit provides a list of outputs and outgoing virtual circuit identifiers. For a cell received on input link i and virtual circuit z, the switch forwards copies to outputs $j_1, j_2, \ldots$ after relabeling them with new virtual circuit identifiers, $y_1, y_2, \ldots$. Notice that if the switch has n inputs and outputs and each output supports up to m virtual circuits, one can describe any collection of multicast virtual circuits with mn words of memory. One simply provides for each (output, VCI) pair, the identity of the (input, VCI) pair from which it is to receive cells. Unfortunately, this method of defining a set of multicast connections is not particularly helpful in switching, as it does not give one a way to go from an (input, VCI) pair to the desired list of (output, VCI) pairs. Existing virtual circuit switch architectures describe multicast virtual circuits in different ways, which while suitable for switching, use far more than mn words of memory. The switch disclosed in the inventor's prior U.S. Pat. No. 4,734,907, for example, requires $mn^2/2$ words of memory under worst-case conditions. Moreover, the time required to update a multicast connection grows with the size of the connection.

As an improvement over this prior implementation of multicasting, the present invention has been developed which describes a multicast switch architecture with O(n log n) hardware complexity that is nonblocking, in the sense that it is always possible to accommodate a new multicast connection or augment an existing one, so long as the required bandwidth is available at the external links, and which requires <2 mn words of memory for multicast address translation. Moreover, the overhead for establishing or modifying a multicast connection is independent of the size of the connection or the switching network. In essence, the present invention relies upon a recycling and "copy-by-two" function creating extra copies or duplicate copies of data cells for routing to the multicast connection. By making multiple passes or recycles of the data cell through the same switch fabric, logical "trees" are set up which branch by two on each pass. The inventor has developed a methodology for adding and dropping multicast connections which provide for structuring of the "tree" to thereby minimize memory requirements and switch bandwidth requirements. In recognition of the fact that data cells will undoubtedly get out of sequence, resequencing buffers are provided and may be implemented either as the cells finally exit the switch fabric or, additionally, as the cells are recycled back through the switch fabric. These resequencers place the data cells back in order so as to ensure the integrity of the data stream.

While a specific implementation of this recycling for multicast connection methodology is disclosed, it should be understood that it may be implemented in a wide variety of switch architectures in order to add multicasting capability.

While the principal advantages and features of the present invention have been described above, a more complete and thorough understanding of the invention may be attained by referring to the drawings and description of the preferred embodiment which follow.

DETAILED DESCRIPTION OF THE PREFERRED EMBODIMENT

Figure 3A:
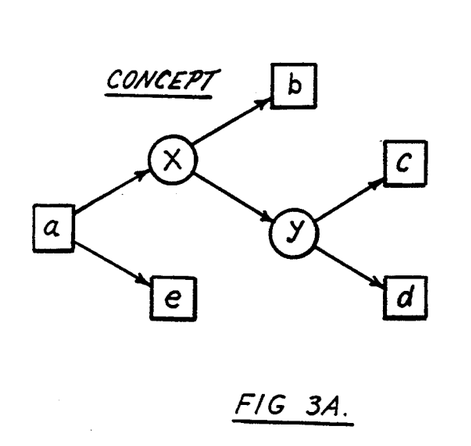
FIGS. 3A–C are a block diagram of the present invention illustrating the recycling of data cells through a switch fabric, along with a conceptual flow chart illustrating the flow of data cells through the switch fabric.
Figure 3B:
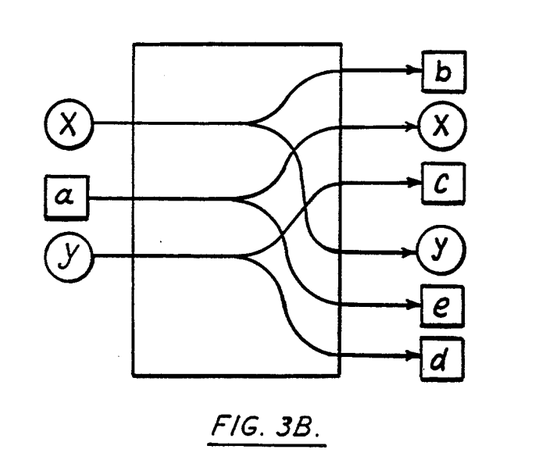

The basic principle behind the present invention is illustrated in FIGS. 3A and 3B. To implement a multicast connection from input a to outputs b, c, d and e, a binary tree is constructed with the source switch port a at its root and the destination switch ports b, c, d, e at its leaves. Internal nodes x, y represent switch ports acting as relay points, which accept cells from the switch but then recycle them back into the switch after relabeling the cells with a destination pair identifying the next two switch ports they are to be sent to. There are many possibilities for constructing the switching network. The combination of the distribution network and routing network described in U.S. Pat. No. 4,734,907 offers one possibility. To provide the "copy-by-two" function, one would augment the routing network so that at the point the paths to the two destinations diverge, it would copy the cell along both paths.

Other switching networks, suitably extended to provide the copy-by-two function, can also be used.

Figure 3C:
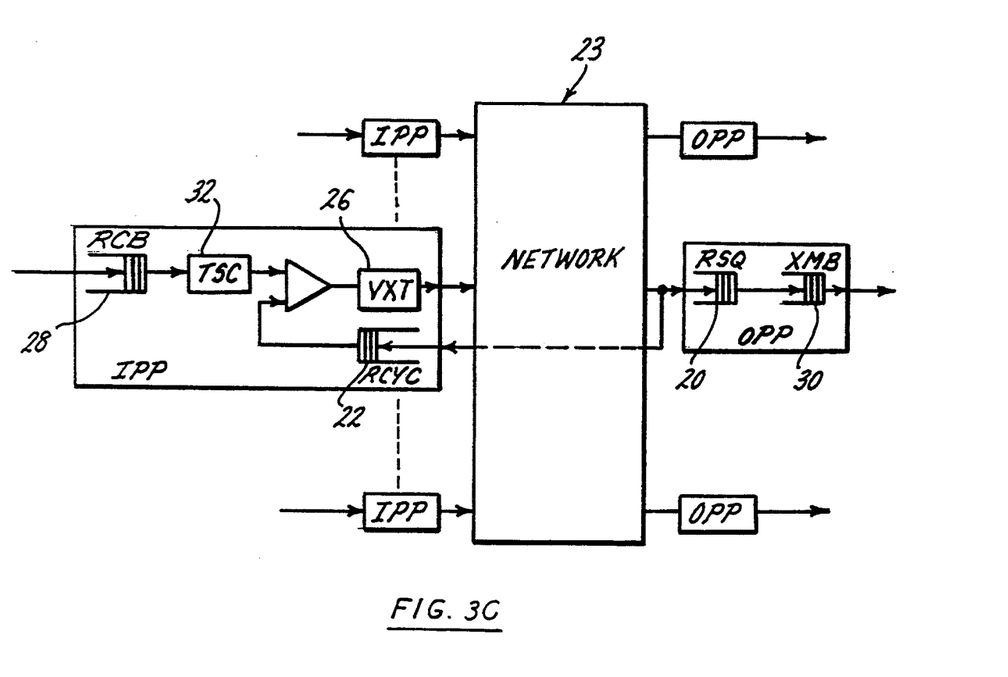

FIG. 3C details the hardware associated with each port of the switching system. Because networks such as the one described in U.S. Pat. No. 4,734,907 may deliver cells in a different order than that by which they enter, the ports are typically augmented with a resequencing buffer to restore the proper ordering on output. The resequencing buffers have an additional role in the recycling architecture, which will be described later. In FIG. 3C, the buffer labeled RSQ 20 is the resequencing buffer, while the buffer labeled RCYC 22 is a simple FIFO. The box labeled VXT 26 in the figure represents the virtual circuit translation table associated with the port. Given a virtual circuit identifier, obtained from a cell's header, the table provides two (output, VCI) pairs that are added to the cell header plus two additional bits that indicate, for each pair, whether it is to be recirculated another time, or not. The element labeled RCB (Receive Buffer) 28 holds cells received from the input link that are waiting to enter the switch fabric, while the element labeled XMB (Transmit Buffer) 30 holds cells waiting to be transmitted on the outgoing link.

In switching networks that allow cells to follow different paths through the network, it is possible for cells to get out of sequence. U.S. Pat. No. 5,339,311, which is a continuation of U.S. Pat. No. 5,260,935, the disclosure of which is incorporated herein by reference, describes a system for reestablishing the proper sequence. The invention involves adding a time stamp to a cell when it first enters the switching network and using that field to reestablish the proper time sequence when the cell exits the switching network. In FIG. 3C, the time stamp field is added by the TSC 32 and the cells are resequenced at the RSQ 20. Note that cells are time stamped only upon their initial entry to the system, which means that the resequencing buffer must be dimensioned to allow for the longest delay.

Figure 4A:
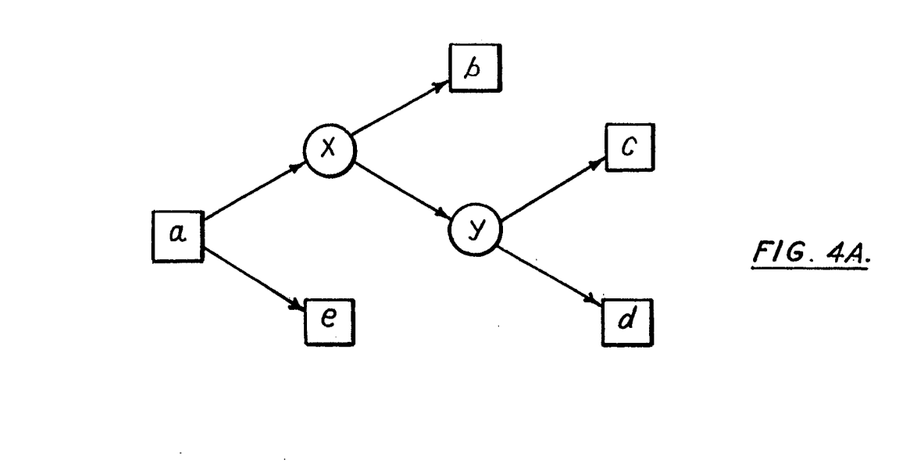
FIGS. 4A and B are a block diagram illustrating the flow of data cells, both in concept and through the switch fabric, for multiple recycles.
Figure 4B:
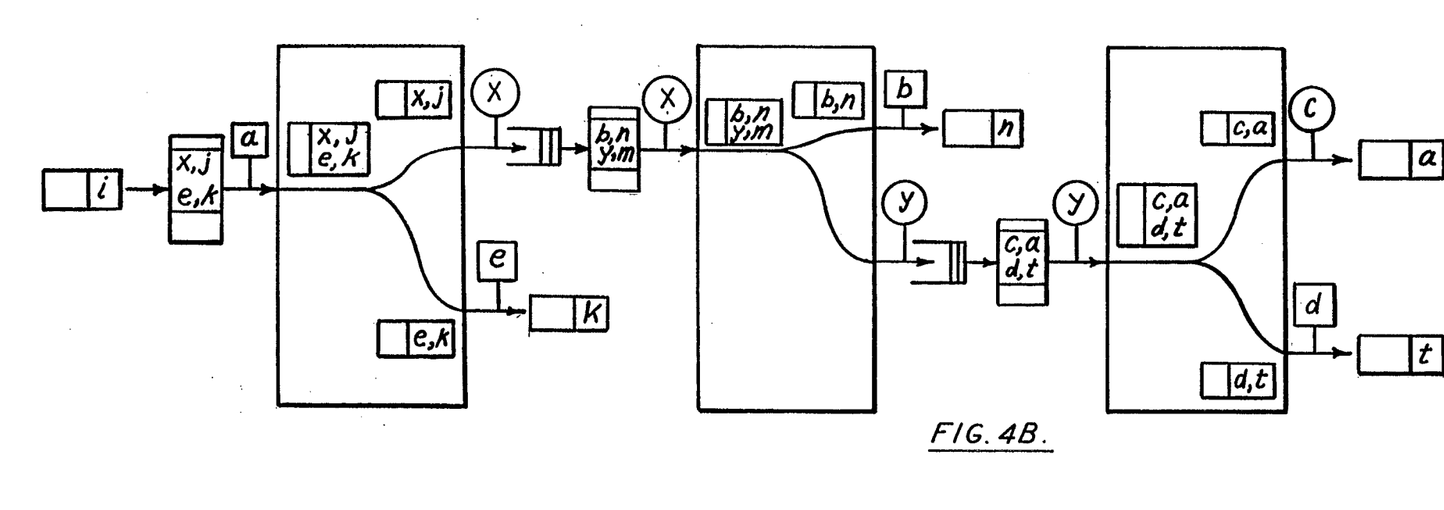

FIGS. 4A and B illustrate the operation of the multicast switch in more detail. In this example, a multicast connection delivers cells from input a to outputs b, c, d and e, using ports x and y as relay points. FIG. 4B shows the implementation of the connection in an "unrolled" form, to clarify the flow of cells through the system. It should be understood, however, that this is purely illustrative. There is in fact just one switching network, not three, and cells are simply sent through it multiple times in order to reach all the destinations. In the example, cells entering at input a with VCI i, are forwarded to output e, VCI k and output x, VCI j. At x, the cell is recycled, with VCI j used to select a new table entry from x's VXT. The resulting information causes the cell to be forwarded to output b, VCI n and output y, VCI m. At y, the cell is recycled again, with the resulting copies delivered to c and d.

Figure 5A:
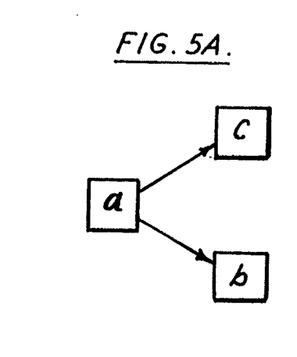
FIGS. 5A–D are a block diagrams and conceptual flow diagram illustrating the addition of an end point to a multicast connection.
Figure 5B:
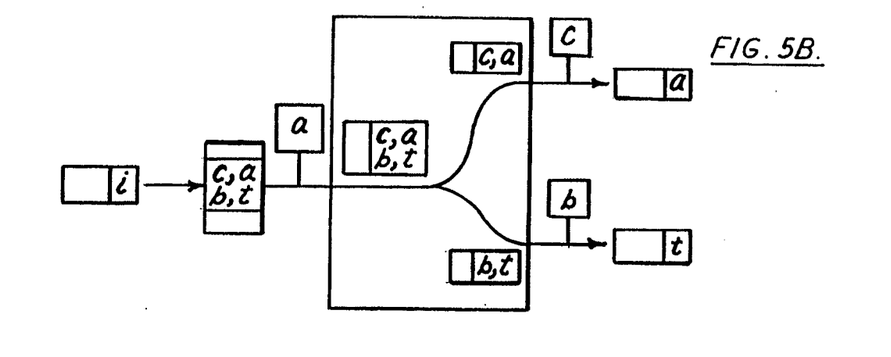
Figure 5C:
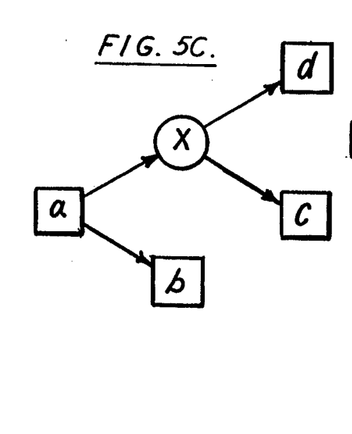
Figure 5D:
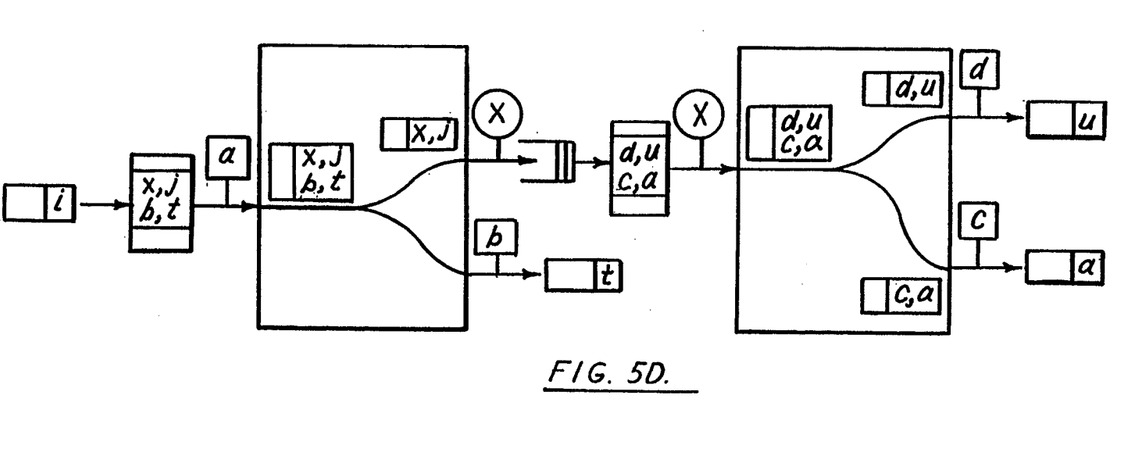
Figure 6A:
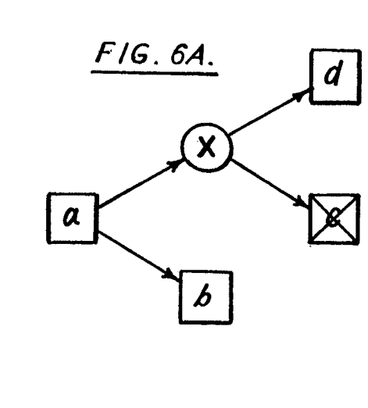
FIGS. 6A–D are a block diagrams and conceptual flow chart illustrating the dropping of an end point in a multicast connection.
Figure 6B:
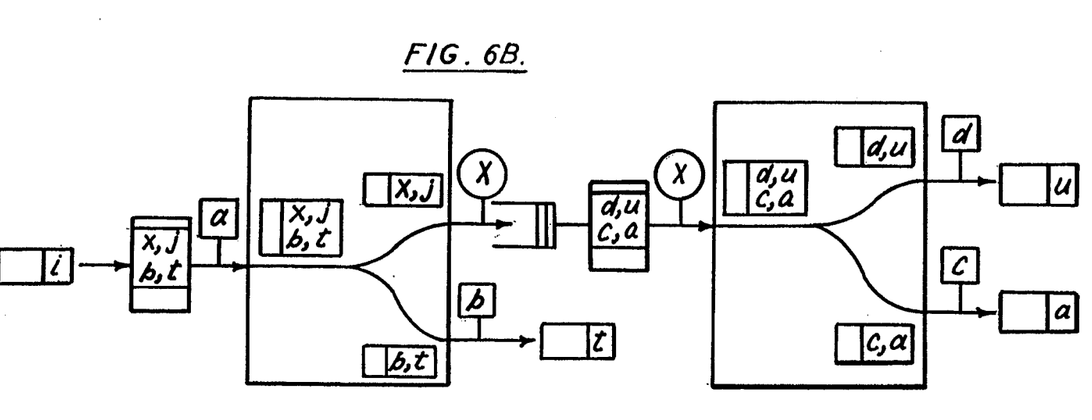
Figure 6C:
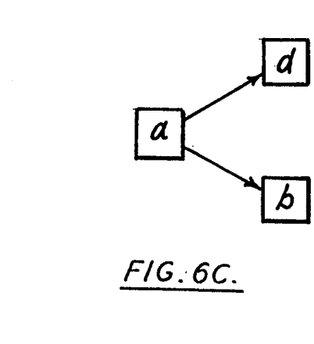
Figure 6D:
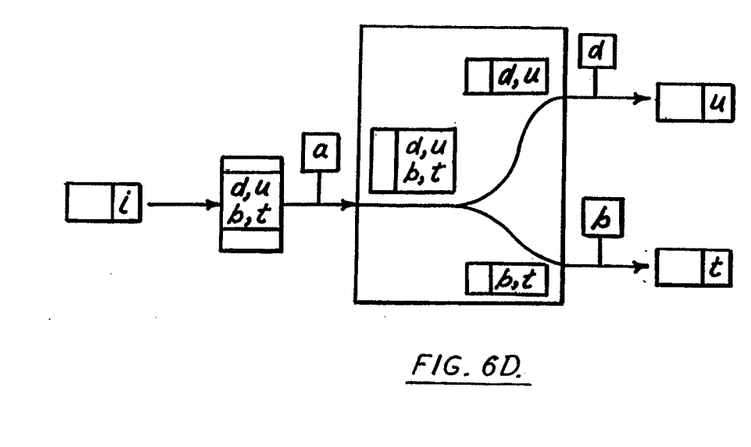

To add an endpoint to a multicast connection, some rearrangement of the connection is needed. This is illustrated in FIGS. 5A-D. Let d be the output that is to be added to a connection, let c be an output closest to the root of the tree and let a be its parent. Select a switch port x with a minimum amount of recycling traffic. Enter c and d in an unused VXT entry at x and then replace c with x in a's VXT entry. These changes have the effect of inserting x into the tree, with children c and d, as illustrated in FIG. 5C.

Dropping an endpoint is similar, as illustrated in FIGS. 6A-D. Let c be the output to be removed from a connection and let d be its sibling in the tree, x be its parent and a its grandparent. In a's VXT entry, replace x with d. If the output to be removed has no grandparent but its sibling has children, replace the parent's VXT entry with the sibling's children. For example, in FIG. 6A, if b were the output to be deleted, we would copy x's VXT entry to a, effectively removing x from the connection. If the output to be removed has no grandparent and its sibling has no children, then we simply drop the output to be removed from its parent's VXT entry, and the connection reverts to a simple point-to-point connection. For example, in FIG. 6C, if b were to be dropped from this connection, we would be left with the point-to-point connection from a to d.

As described, the invention requires a large resequencer at each output port processor. The total amount of resequencing hardware can be reduced if cells are resequenced on every pass through the network. This requires changing RCYC 22 in FIG. 3C to a resequencing buffer and moving the TSC 32 to follow the VXT 26. However, this requires some extra care when connections are modified.

Figure 7A:
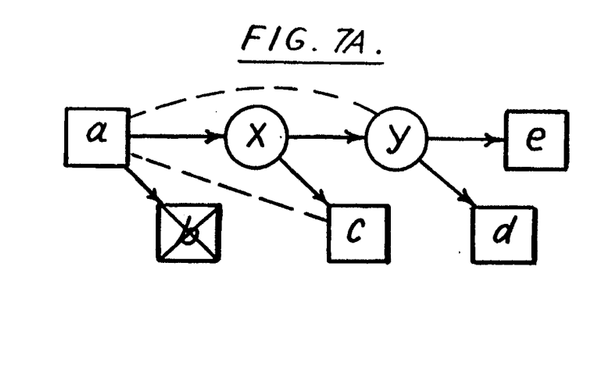
FIGS. 7A–C are a block diagrams and conceptual flow chart illustrating the resequencer's operation during transitions in multicast connections.
Figure 7B:
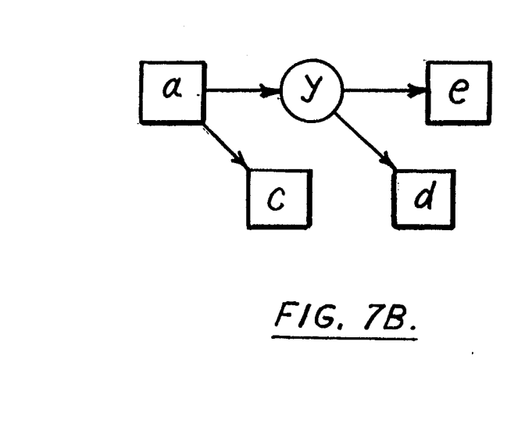
Figure 7C:
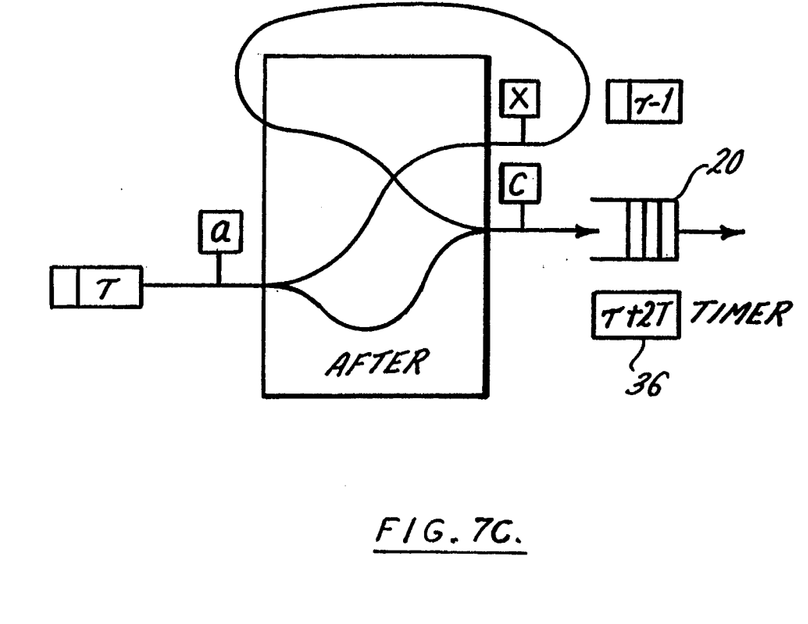

When an endpoint is added to a connection its new sibling becomes repositioned in the tree and its cells experience a longer delay, because of the additional pass through the network. Consequently, there is a momentary gap in the flow of cells to the output, but the ordering of the cells is unaffected. However, when an endpoint is removed from a connection, outputs immediately following the cut point, are moved closer to the root of the tree and so the cells being sent to them experience a shorter delay and are at risk of being missequenced with cells that left the cut point just before the change. To prevent cells from being delivered out of order, the resequencer must provide an extra delay for cells forwarded immediately after the cut occurs. This is illustrated in FIGS. 7A-C. Let T be the resequencer delay threshold and let R be a register in the time stamp circuit. In general, the clock is incremented by 1 on every operational cycle of the system but the time stamp field is augmented with an extra bit that denotes "half steps" of the clock. At the moment that a connection is changed (call this moment $\pi$), R is set to value $\pi+T$. After that, all data cells for the affected connection are given a time stamp equal to either the current time or the value of R, whichever is larger. If R is larger, one-half is added to the value of R. By the time $\pi+2T$, the current time is certain to be larger than R, so from that point on, the time stamp process reverts to its normal operation and the data cells have been reliably resequenced.

Figure 8:
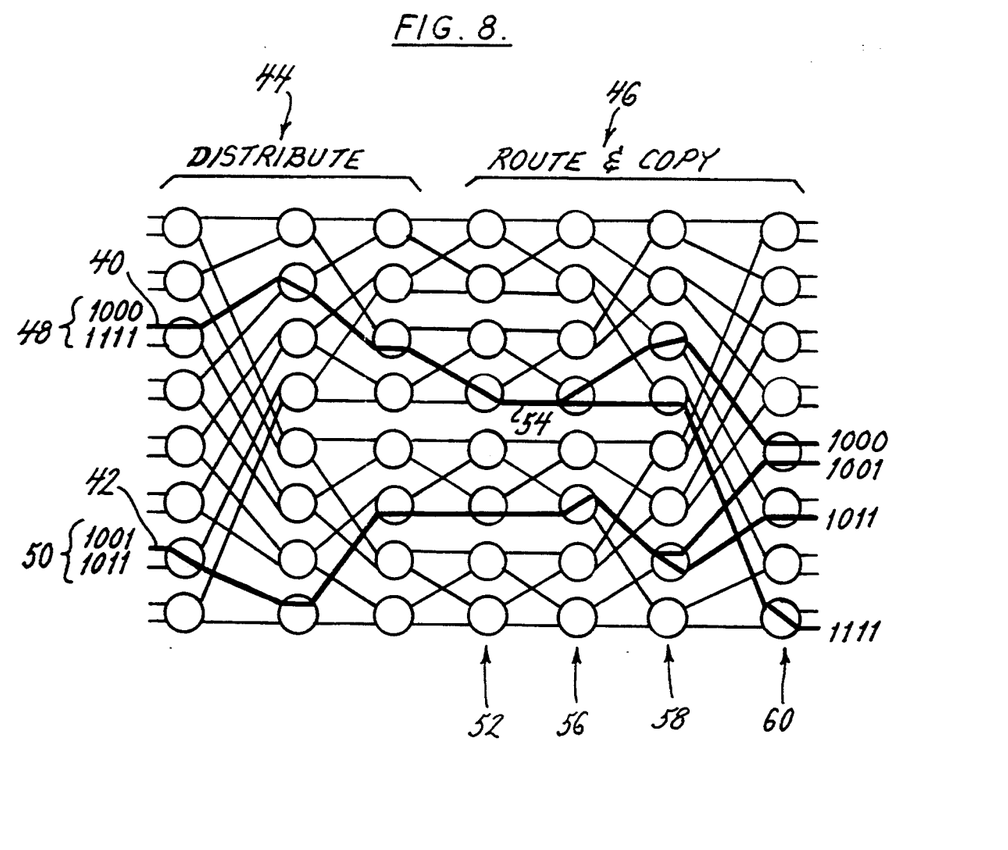
FIG. 8 is a schematic diagram of an illustrative switch fabric implementing a nonblocking implementation of the copy-by-two function.

As shown in FIG. 8, an implementation is illustrated for a specific switching network which utilizes a Distribution Section and a Route & Copy Section. As illustrated therein, a single data cell having a pair of addresses appears at switch fabric input 40. The distribution portion 44 has three stages which distribute cells evenly to ensure that the load on the internal links is less than or equal to the load on the external links. The Route & Copy Section 46 then begins routing at each successive stage of its four stages by using successive bits of the address pair 48. As illustrated in FIG. 8, both addresses in the address pair 48 include one as their left-most bit. Hence through stage 52, the data cell is routed along the lower branch 54 to a node in the next stage 56. At that stage, the second from the left bit of each address in pair 48 is compared and, as this is the first stage at which the addresses differ, copies of the data cell are made and the address pair is divided so that each data cell has a single address and the cells are separately switched or routed to the third stage 58. At this stage, the data cells continue to be routed according to the next successive bit, or third bit, from the left until they reach the fourth stage 60 which again routes the data cell by its last bit, or right-most bit, of its address such that it appears at the correct output. In this implementation, the four-bit address defines an address in a 16 link switch. This same implementation may be made with networks having larger switches with addresses in different number bases and different numbers of digits.

Connections can also be constructed using trees with larger branching factors (that is, in which nodes have more than two children). Larger branching factors reduce the amount of recycling, reducing the amount of bandwidth needed for recycling cells and reducing delay, but increasing the size of table entries and the per cell overhead. In practice, one cannot maintain b children at all internal nodes when b>2, but it is possible to have at most one internal node per tree that has fewer than b children. Maintaining this property may require that the tree be restructured when an endpoint is dropped. The number of steps required for this restructuring is proportional to the tree depth, in the worst-case.

Another variant of the invention involves copying cells sequentially at the input port processor instead of within the switching network. In this implementation, whenever the VXT entry has multiple outputs listed, a copy is made for each output, labeled with the output port and virtual circuit identifier, and sent to the switching network. This allows any point-to-point switching network to be used, eliminating the need for a "copy-by-two" function.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a packet switch for an ATM network, said switch including a switch fabric having a plurality of inputs and a plurality of outputs, said switch fabric including means for routing a plurality of data cells from a plurality of switch fabric inputs to a plurality of switch fabric outputs, the improvement comprising means for recycling selected data cells through said switch fabric, said switch fabric including means for copying said selected data cells as they traverse the switch fabric, to thereby implement multicasting in said switch.

2. The switch of claim 1 wherein said recycling means includes means for recycling selected data cells a plurality of times through said switch fabric.

3. The switch of claim 2 wherein said copying means includes means for copying said recycled data cells to thereby create a plurality of duplicate data cells each time a data cell is recycled through said switch fabric and means for addressing said plurality of duplicate data cells for routing to different multicast destinations.

4. The switch of claim 3 wherein said copying means includes means for copying by two each of said recycled data cells to thereby create a second duplicate data cell.

5. The switch of claim 3 further comprising means for resequencing all of said data cells.

6. The switch of claim 5 wherein said resequencing means includes means for resequencing said data cells upon each pass through said switch fabric.

7. The switch of claim 5 wherein said resequencing means includes means for resequencing all of said data cells upon their last exit from said switch fabric.

8. The switch of claim 7 wherein said resequencing means includes means for resequencing all of said data cells only upon their last exit from said switch fabric.

9. The switch of claim 3 wherein said switch fabric includes said copying means, each of said recycled data cells having a plurality of output addresses, said switch fabric including means for routing said recycled data cells by comparing the addresses comprising each of said plurality of addresses.

10. The switch of claim 9 wherein said copying means includes means for copying said data cell upon comparing said addresses in a bit comparison and finding a mismatch in value of compared bits.

11. The switch of claim 9 wherein each of said recycled data cells has a pair of output addresses.

12. The switch of claim 11 wherein said copying means includes means for copying said recycled data cell upon comparing said address pairs in a bit-by-bit comparison and finding a mismatch in value of compared bits.

13. A method for implementing multicasting in a packet switch for an ATM network, said packet switch including a switch fabric having a plurality of inputs and a plurality of outputs, said switch fabric including means for routing a plurality of data cells from said inputs to said outputs, the method comprising the steps of:
determining which data cells are to be multicast to a plurality of destinations;
copying each of said multicast data cells to thereby create at least one duplicate data cell as said multicast data cells are routed through said switch fabric; and
recycling said multicast data cells through said switch fabric.

14. The method of claim 13 further comprising the step of resequencing all of said data cells.

15. The method of claim 14 wherein the step of resequencing includes the step of resequencing all of said data cells as they exit the switch fabric.

16. The method of claim 14 wherein the step of resequencing includes the step of resequencing said multicast data cells each time they are recycled through said switch fabric.

17. The method of claim 13 wherein each of said multicast data cells has a plurality of addresses and further comprising the step of routing said multicast data cells by comparing their addresses with each other.

18. The method of claim 17 wherein the step of copying includes the step of copying said multicast data cells upon said routing step determining a difference in said plurality of addresses.

19. The method of claim 18 wherein said addresses are expressed in a binary code, and wherein the routing step includes the step of comparing said binary codes with each other.

20. The method of claim 13 further comprising the steps of:
assigning a plurality of addresses to each of said recycled data cells; and
routing said data cells having a plurality of addresses by comparing said addresses with each other.

21. The method of claim 20 wherein the step of routing includes the step of comparing said plurality of addresses on a bit basis, and wherein the step of copying includes the step of copying said recycled data cell as said comparison detects a difference between corresponding bits of said plurality of addresses.

22. The method of claim 20 wherein the step of assigning addresses includes the step of assigning only two addresses to each of said recycled data cells.

23. The method of claim 22 wherein the step of routing includes the step of comparing said pair of addresses on a bit-by-bit basis, and wherein the step of copying includes the step of copying said recycled data cell as said comparison detects a difference between corresponding bits of an address pair.

24. In a packet switch for an ATM network, said switch including a switch fabric having a plurality of inputs and a plurality of outputs, said switch fabric including means for routing a plurality of data cells from a plurality of switch fabric inputs to a plurality of switch fabric outputs, and wherein at least some of said data cells have a plurality of addresses thereby indicating a multicast data cell, the improvement comprising means for recycling said multicast data cells through said switch fabric, means for routing said multicast data cells by comparing said plurality of addresses, means for copying said multicast data cells as said multicast data cells traverse said switch fabric to create at least one duplicate data cell in response to said address comparison means, means for assigning at least one address to each of said duplicate data cells, and means for resequencing all of said data cells upon their exit from said switch fabric.

25. The switch of claim 24 wherein each multicast data cell has no more than two addresses, and said copying means includes means for copying said multicast data cell only into a single duplicate data cell upon each pass through the switch fabric.

* * * * *